(12) United States Patent
Savage et al.

(10) Patent No.: US 11,203,066 B2
(45) Date of Patent: Dec. 21, 2021

(54) SYSTEMS AND METHODS FOR ADDING MATERIAL TO CASTINGS

(71) Applicant: CUMMINS INC., Columbus, IN (US)

(72) Inventors: Howard S. Savage, Columbus, IN (US); Roger D. England, Loudon, TN (US); Todd M. Wieland, Columbus, IN (US); Rafael Hernandez Ruiz Esparza, Cerro de San Pedro (MX); Nikhil Doiphode, Columbus, IN (US); John A. Rupp, Columbus, IN (US)

(73) Assignee: Cummins Inc., Columbus, IN (US)

( * ) Notice: Subject to any disclaimer, the term of this patent is extended or adjusted under 35 U.S.C. 154(b) by 112 days.

(21) Appl. No.: 16/461,093

(22) PCT Filed: Nov. 14, 2017

(86) PCT No.: PCT/US2017/061497
§ 371 (c)(1),
(2) Date: May 15, 2019

(87) PCT Pub. No.: WO2018/093760
PCT Pub. Date: May 24, 2018

(65) Prior Publication Data
US 2020/0055119 A1   Feb. 20, 2020

Related U.S. Application Data

(60) Provisional application No. 62/422,976, filed on Nov. 16, 2016.

(51) Int. Cl.
*B33Y 30/00* (2015.01)
*B22F 10/30* (2021.01)
(Continued)

(52) U.S. Cl.
CPC ............... *B22F 10/20* (2021.01); *B22F 7/08* (2013.01); *B23K 26/342* (2015.10); *B33Y 10/00* (2014.12);
(Continued)

(58) Field of Classification Search
CPC .. B22F 10/00; B22F 7/08; B22F 10/10; B22F 10/20; B22F 10/30; B22F 12/00;
(Continued)

(56) References Cited

U.S. PATENT DOCUMENTS 5,914,059 A    6/1999   Marcin et al.
6,554,600 B1   4/2003   Hofmann et al.
(Continued)

FOREIGN PATENT DOCUMENTS

CN    102259187 A    11/2011
CN    105339551 A     2/2016
(Continued)

OTHER PUBLICATIONS

I. Gibson, D.W. Rosen, and B. Stucker, Additive Manufacturing . . . Technologies, DOI 10.1007/978-1-4419-1120-9_1, Springer Science+Business Media, LLC 2010 (Gibson). (Year: 2010).*
(Continued)

*Primary Examiner* — Rebecca Janssen
(74) *Attorney, Agent, or Firm* — Foley & Lardner LLP

(57) ABSTRACT

A system includes a controller, a pretreating machine, and an additive manufacturing machine. The pretreating machine is coupled to the controller. The pretreating machine includes a pretreater structured to form an interface layer on a component. The additive manufacturing machine is coupled to the controller. The additive manufacturing machine includes a material feed and a forming beam. The material feed is configured to selectively provide a first amount of material on the interface layer. The forming beam is con-
(Continued)

figured to substantially melt the first amount of material, thereby forming a first layer of a first material deposit on the interface layer.

13 Claims, 6 Drawing Sheets

(51) Int. Cl.
  *B22F 10/20* (2021.01)
  *B33Y 10/00* (2015.01)
  *B33Y 50/02* (2015.01)
  *B23K 26/342* (2014.01)
  *B22F 7/08* (2006.01)

(52) U.S. Cl.
  CPC ............... *B33Y 30/00* (2014.12); *B33Y 50/02* (2014.12); *B22F 10/30* (2021.01)

(58) Field of Classification Search
  CPC ......... B33Y 10/00; B33Y 30/00; B33Y 50/02; B23K 26/342; Y02P 10/25; B23P 6/02; B23P 6/00
  See application file for complete search history.

(56) References Cited

U.S. PATENT DOCUMENTS

| | | |
|---|---|---|
| 2003/0088980 A1 | 5/2003 | Arnold |
| 2008/0260964 A1 | 10/2008 | Bagavath-Singh et al. |
| 2011/0061591 A1 | 3/2011 | Stecker |
| 2012/0222306 A1* | 9/2012 | Mittendorf .............. F01D 5/005 29/889.1 |
| 2013/0316183 A1 | 11/2013 | Kulkarni et al. |
| 2014/0259666 A1 | 9/2014 | Baughman et al. |
| 2014/0308153 A1 | 10/2014 | Ljungblad |
| 2015/0047168 A1 | 2/2015 | James et al. |
| 2015/0306699 A1 | 10/2015 | Honda |
| 2016/0273114 A1* | 9/2016 | Hongoh .................... C23C 4/02 |
| 2017/0038312 A1* | 2/2017 | Auxier ............... B23K 35/3033 |
| 2017/0239722 A1* | 8/2017 | Goehlich .............. B29C 64/118 |
| 2018/0243992 A1 | 8/2018 | Flitsch et al. |

FOREIGN PATENT DOCUMENTS

| | | |
|---|---|---|
| EP | 2 317 075 | 5/2011 |
| EP | 2 495 397 | 3/2012 |
| WO | WO-2014/074947 | 5/2014 |
| WO | WO-2015/092442 A1 | 6/2015 |

OTHER PUBLICATIONS

Office Action for CN Application No. 201780069921.5, dated Aug. 24, 2020, pp. 1-7. (English Translation).

International Search Report and Written Opinion from corresponding PCT Application No. PCT/US2017/061497, dated Jan. 26, 2018, pp. 1-7.

* cited by examiner

SYSTEMS AND METHODS FOR ADDING MATERIAL TO CASTINGS

CROSS-REFERENCE TO RELATED APPLICATIONS

The present application is the U.S. national phase of PCI Application No. PCT/US2017/061497, filed Nov. 14, 2017, which claims priority to U.S. Provisional Patent Application No. 62/422,976, entitled "Systems and Methods for Adding Material to Castings" and filed Nov. 16, 2016 and the contents of which are incorporated herein by reference.

TECHNICAL FIELD

The present disclosure relates to the field of manufacturing systems and processes for internal combustion engines and components thereof.

BACKGROUND

There are various situations where one may perform structural repairs or modifications on various components of a system such as components of an internal combustion engine. For example, with respect to components of an internal combustion engine, a cylinder head may crack and need repair, or the engine may be remanufactured to modify the engine for a target application. For cast iron components, such structural repair or modification may be performed by arc welding. However, arc welding requires a relatively large amount of preheating and thus, a relatively large amount of energy. Further, arc welding is difficult to automate and instead relies upon a skilled operator, and arc welding does not provide an ability to tailor qualities of added material for a target application.

SUMMARY

In a first set of embodiments, a system includes a controller, a pretreating machine, and an additive manufacturing machine. The pretreating machine is coupled to the controller. The pretreating machine includes a pretreater structured to form an interface layer on a component. The additive manufacturing machine is coupled to the controller. The additive manufacturing machine includes a material feed and a forming beam. The material feed is configured to selectively provide a first amount of material on the interface layer. The forming beam is configured to substantially melt the first amount of material, thereby forming a first layer of a first material deposit on the interface layer.

In a second set of embodiments, a method for depositing material on a component includes: analyzing the component to determine desired changes to the component; forming an excavation in a target area of the component; applying an interface layer on the component; and forming a first layer of a first material deposit on the interface layer.

In a third set of embodiments, a system includes a controller, an excavation machine, a pretreating machine, and an additive manufacturing machine. The excavation machine is coupled to the controller. The excavation machine includes an excavator configured to selectively remove material from a component thereby forming an excavation. The pretreating machine is coupled to the controller. The pretreating machine includes a pretreater configured to selectively form an interface layer on the excavation. The additive manufacturing machine is coupled to the controller. The additive manufacturing machine is configured to selectively form a first deposit of a first amount of material on the interface layer.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
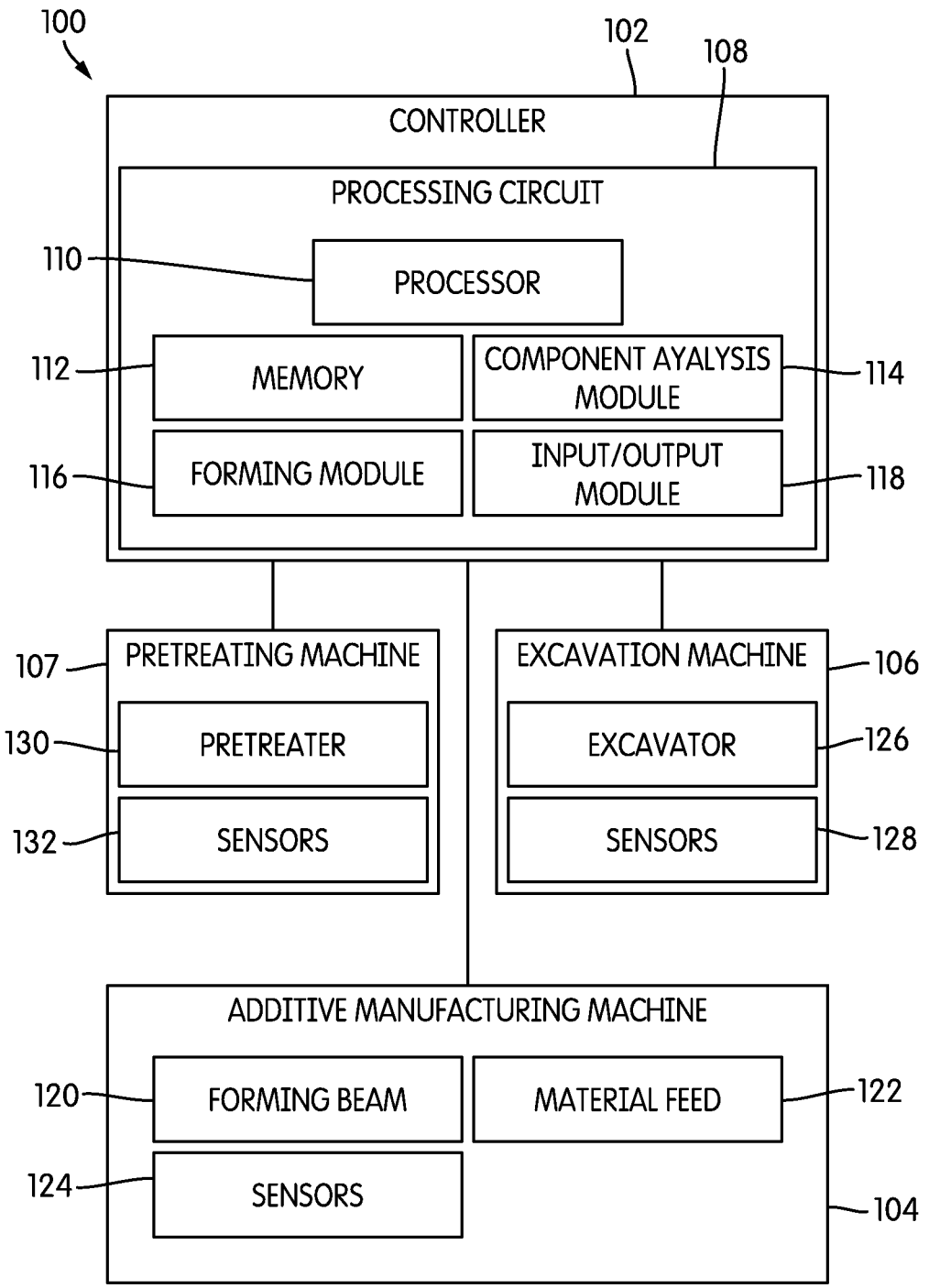
FIG. 1 is a block diagram of an example of a system for forming material deposits on a component according to an embodiment.

It will be recognized that the figures are representations for purposes of illustration. The figures are provided for the purpose of illustrating one or more implementations with the explicit understanding that they will not be used to limit the scope or the meaning of the claims.

DETAILED DESCRIPTION

In the following detailed description, reference is made to the accompanying drawings, which form a part thereof. In the drawings, similar symbols identify similar components unless otherwise specified. The illustrative embodiments described in the detailed description, drawings, and claims are not meant to be limiting. Other embodiments may be used, and changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations which are made part of this disclosure.

Referring generally to the figures, systems and techniques of the present disclosure relate to forming material deposits on components. In some embodiments, the systems and techniques relate to forming material deposits on cast iron components, although the disclosure is not so limited. In some embodiments, a component (e.g., a cast iron component) can be a component of an internal combustion engine (e.g., a diesel engine, a gasoline engine, a natural gas engine, a propane engine, a forced induction engine, a naturally aspirated engine, or any other internal combustion engine). A pretreatment includes forming an interface layer on the component, and selectively forming material deposits on the interface layer using an additive manufacture (AM) machine. The interface layer thermally isolates the component from the material deposits such that the structural integrity of the material deposits and the component is protected. In this way, the interface layer facilitates relatively high speed formation of material deposits as compared, for example, to arc welding.

An advantage of the interface layer is that the interface layer is more ductile than the component, thus the interface layer facilitates mitigation of thermal stresses in the material deposits that occur as the material deposits cool. Without the interface layer, there would be no thermal isolation between the material deposits and the cast iron component. The cast iron component can dissipate heat relatively quickly, so that, without the interface layer, the material deposits would cool down too quickly, which could result in undesirable cracking in a heat affected zone (HAZ) of the material deposits.

Additionally, the material deposits as they are formed may cause the interface layer to at least partially melt, thus increasing a bond strength between the interface layer and the component.

The material deposits are formed in layers; therefore a further advantage is that it is possible that each layer of each material deposit may be formed from a different material or may be formed with different properties.

The systems and techniques of the present disclosure facilitate a reduction in remanufacturing time and prototyping time, resulting in reduced cost. Further, the systems and techniques of the present disclosure facilitate restoration or modification of a component without remaking or re-machining of the entire component, which can be time and cost prohibitive. For example, the systems and techniques of the present disclosure facilitate modification of geometry and/or properties of a component without creation of modified molding, recasting, or re-machining of a new casting with desired modifications.

FIG. 1 illustrates a system 100 for adding material deposits on a component. The system 100 includes a controller 102, an AM machine 104, an excavation machine 106, and a pretreating machine 107.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

The controller 102 includes a processing circuit 108 that includes a processor 110, a memory 112, a component analysis module 114, a forming module 116, and an input/output module 118. The AM machine 104 includes a forming beam 120, a material feed 122, and sensors 124. The excavation machine 106 includes an excavator 126 and sensors 128. The pretreating machine 107 includes a pretreater 130 and sensors 132.

While not shown, it is understood that any of the AM machine 104, the excavation machine 106, and the pretreating machine 107 may include a processing circuit, a processor, a memory, and any desired modules for locally and/or collectively controlling the AM machine 104, the excavation machine 106, or the pretreating machine 107, respectively, or for otherwise contributing to the system 100.

The term module herein refers to circuitry for performing the functionality described. Circuitry may include analog circuit components, digital circuit components, or a combination of analog and digital circuit components. Further, circuitry may include components that implement instructions from a non-transient medium (e.g., from a memory) to perform the functionality described, where the instructions may be hard-coded as a physical structure or soft-coded (e.g., software instructions stored in the memory to configure the circuit in a specific manner). Modules may be distributed across various hardware or computer based components. Non-limiting examples of module implementation components include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The description herein including modules emphasizes the structural independence of the aspects of the controller 102 and illustrates one grouping of operations and responsibilities of the controller 102. Other groupings that execute similar overall operations are understood to be within the scope of the present disclosure.

In some implementations, the controller 102 forms a portion of a processing subsystem including one or more computing devices having memory, processing, and communication hardware. In certain implementations, the controller 102 is structured to perform certain operations, such as those described herein in relation to FIGS. 2-12. The controller 102 may be a single device or a distributed device. The controller 102 is configured to interface (e.g., communicate) with the AM machine 104, with the excavation machine 106, and with the pretreating machine 107. The controller 102 cooperates with the AM machine 104, the excavation machine 106, and the pretreating machine 107 to make desired changes to a component. For example, the processing circuit controls the AM machine 104, the excavation machine 106, and the pretreating machine 107 to make the desired changes.

The processor 110 may include a microprocessor, an application-specific integrated circuit (ASIC), a field-programmable gate array (FPGA), another type of processing device, discrete processing circuitry, or combinations thereof. The memory 112 may include, but is not limited to, electronic, optical, magnetic, or any other storage or transmission device capable of providing program instructions to the processor 110. For example, the memory 112 may include read only memory (ROM), electrically erasable programmable ROM (EEPROM), erasable programmable ROM (EPROM), flash memory, or any other suitable memory from which the processor 110 can read instructions. The instructions may include code generated in any suitable programming language. The processor 110 may access instructions stored in the memory 112 to perform the functionality ascribed to the processor 110. The instructions may represent one or more computer programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

The processor 110 may use the component analysis module 114 to analyze a condition of the component prior to modification. This analysis may provide the processor 110 with a baseline shape of the component, relative to which the desired changes will be formed. The component analysis module 114 may cooperate with a camera, 3D scanner, x-ray scanner, or other imaging device to obtain information related to the component. For example, the component analysis module 114 may facilitate scanning of the component for flaws. Alternatively, the component analysis module 114 may receive or retrieve information related to the component from a digital file. For example, the component analysis module 114 may access a digital component archive (e.g., library, database, etc.) and retrieve a 3D model (or set of 2D models) of the component from the archive.

The forming module 116 determines changes to be made to the component according to information provided from the component analysis module 114 and information regarding a desired final component disposition. For example, the forming module 116 may determine where material needs to be removed, where material needs to be added, and any desired property changes relative to the information regarding the present status of the component from the component analysis module 114.

The input/output module or modules 118 may facilitate interaction of the controller 102 with the AM machine 104, with the excavation machine 106, and with the pretreating machine 107. For example, the input/output module 118 may translate instructions received from the processor 110 into a format that can be read by the AM machine 104, the excavation machine 106, or the pretreating machine 107. Additionally, the input/output module 118 may provide information to an operator or receive commands from an operator through a user interface (not shown). For example, the input/output module 118 may provide the operator with a 3D view of the component illustrating the desired changes to be made to the component. In another example, the input/output module 118 may receive desired changes to the component from the operator. For example, the operator may change dimensions, properties, and/or other characteristics of the desired changes on a monitor and the input/output module 118 may convey these changes to the forming module 116. The input/output module 118 in some embodiments may also facilitate operator selection (e.g., via a touch screen, etc.) of a 3D model of the component within the archive for being provided to the component analysis module 114.

Turning now to the AM machine 104, the forming beam 120 may be a laser beam, an electron beam, or another beam configured to controllably provide heat to a target location. The heat provided by the forming beam 120 melts material provided by the material feed 122. For example, the material feed 122 may provide material at a target location and the forming beam 120 may melt the material at the target location. The forming beam 120 has a small spot size and quick scan speeds as compared to arc welding; thus, the forming beam 120 may form features with increased resolution as compared to arc welding. Additionally, use of the AM machine 104 can be automated because the forming beam 120 is machine-controllable and does not rely upon a skilled operator to produce desirable results.

The material feed 122 may provide material using various mechanisms such as via powder feed, wire feed, or other mechanism. The material feed 122 may provide the material at a location as instructed by the controller 102. Size, intensity, location, shape, or other properties of the forming beam 120 may be controlled by the controller 102. The amount of material provided, the type of material provided, the location of the material provided, and other properties of the material feed 122 may also be controlled by the controller 102. The sensors 124 may provide information related to the forming beam 120, the material feed 122, or the component to the controller 102. For example, the sensors 124 may provide a present shape or depth of the added materials to the controller 102, which the forming module 116 could compare to the desired changes such that the input/output module 118 could display this comparison to the operator.

In some cases, it may be desired to first remove material from the component using the excavation machine 106 before adding material to the component using the AM machine 104. In these cases, the forming module 116 may provide instructions to the excavation machine 106 for removing material from the component. For example, it may be desirable to initially remove a flawed (e.g., cracked, corroded, etc.) region from the component. The excavator 126 may include one or more of various material removal machines such as a mill, a water jet, a drill, a plasma torch, or other removal machines. The sensors 128 may provide information related to the excavator 126 to the controller 102. For example, the sensors 128 may provide a present shape of the component to the controller 102, which the forming module 116 could compare to the instructions for removing material such that the input/output module 118 could display this comparison to the operator.

When the excavation machine 106 is used to create an excavation, the AM machine 104 may form material deposits in the excavation. For example, the AM machine 104 may form the material deposits exclusively within the excavation created by the excavation machine 106. Alternatively, the AM machine 104 may form the material deposits partially within, or outside of, the excavation created by the excavation machine 106. For some components, the desired changes do not require the excavation machine 106 to be used because no excavations are needed. For example, if the desired changes are simply the addition of material, the excavation machine 106 may not be used.

In some embodiments, the AM machine 104 may be capable of removing material as well as adding material. For example, the forming beam 120 may be capable of both removing material and melting material added by the material feed 122.

The pretreating machine 107 provides an interface layer to the component upon which the AM machine 104 forms the material deposits. The interface layer thermally isolates the material deposits from the component such that the structurally integrities of the material deposits and the component are protected. If the excavation machine 106 is used, the pretreating machine 107 may provide the interface layer partially or completely over the excavated portion of the component. The pretreater 130 disposes the interface layer. For example, the pretreater 130 may be a thermal sprayer, a nozzle, or other mechanism for providing material. The sensors 132 may provide information related to the pretreater 130 to the controller 102. For example, the sensors 132 may provide a present thickness or outline of the interface layer to the controller 102, which the forming module 116 could compare to the instructions for a desired thickness or outline of the interface layer such that the input/output module 118 could display this comparison to the operator.

FIGS. 2-11 illustrate, in various views and perspectives, techniques for adding material to a component via the system 100 according to embodiments of the present disclosure. In some embodiments, the processes are implemented by the system 100 for a component of an internal combustion engine that is part of a vehicular system (e.g., an automobile, a truck, a commercial vehicle, an emergency vehicle, a construction vehicle, etc.); however, the concepts of the present disclosure are not limited to implementation with an internal combustion engine that is part of a vehicular system.

Figure 2:
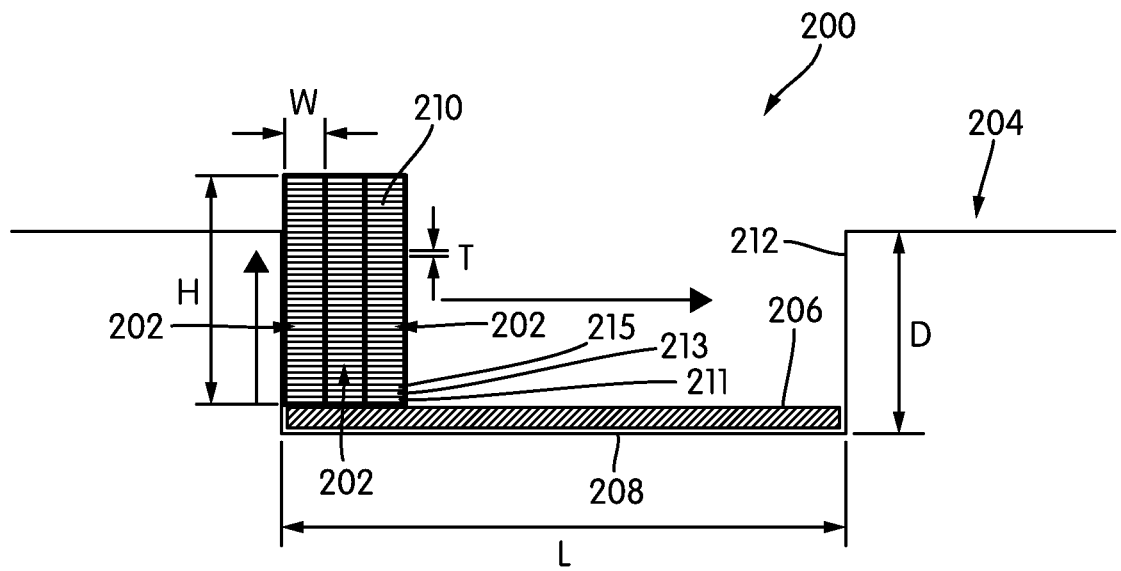
FIG. 2 is a cross-sectional view of material being added to a component in an example process according to an embodiment.

FIG. 2 illustrates a process 200 for adding material deposits 202 on a component 204 of an internal combustion engine, as implemented by the system 100. The process 200 uses the AM machine 104 to perform AM on the component 204. For example, the process 200 may use the forming beam 120 to perform selective laser sintering (SLS) or 3D printing on the component 204. The process 200 involves adding the material deposits 202 to the component 204 in a molten form and then allowing the material deposits 202 to cool and solidify. It is to be noted that, in some embodiments, a non-molten material may be provided by the material feed 122 and converted to molten form, such as by the forming beam 120. The component 204 in some embodiments is constructed from cast iron. The component 204 may be, for example, a cylinder head, a manifold (e.g., intake manifold, exhaust manifold, etc.), a turbocharger, or other component of an internal combustion engine, or a component of another system.

When the component 204 is constructed from cast iron, several challenges exist for the process 200. Because the process 200 uses a laser, the process 200 is typically a relatively low heat input process, due to small spot size and quick scan speeds of the forming beam 120 as compared to arc welding. Additionally, the component 204 can be relatively large and can dissipate heat relatively quickly due to the metallurgical properties of the component 204. The quick heat dissipation can result in cracking of the material deposits 202 in a HAZ of the material deposits 202, and the material deposits 202 can thereby be structurally comprised. These effects can be amplified as additional layers of material deposits 202 are formed.

To counter the heat dissipation by the component 204, the process 200 includes pretreating the component 204 with a low heat input process, using the pretreating machine 107, prior to disposing the material deposits 202 on the component 204. The pretreating machine 107 deposits an interface layer 206 on the component 204. The pretreating machine 107 may apply the interface layer 206 via a thermal spray to the component 204 or by flowing the interface layer 206 onto the component 204, such as through a brazing process. In some embodiments, the interface layer 206 is a nickel-based alloy (e.g., cupronickel, ferronickel, etc.). The interface layer 206 is relatively thin compared to a thickness of the material deposits 202. When the interface layer 206 contacts the component 204, a substrate 208 portion of the component 204 may experience a phase transformation (e.g., from α-iron (body centered cubic) to γ-iron (face centered cubic)).

The material deposits 202 may be formed on the interface layer 206 by the AM machine 104 through laser deposition (e.g., pulsed laser deposition (PLD)), laser cladding (e.g., laser hot wire cladding), or other laser-based technique. In some embodiments, when the AM machine 104 uses laser deposition, the forming beam 120 melts a portion of the interface layer 206, forming a molten pool, and powdered metal is caused to accumulate via the material feed 122 in the molten pool, thus forming the material deposits 202. In other embodiments, when the AM machine 104 uses laser cladding, the forming beam 120 melts a portion of the interface layer 206 forming a molten pool, and metal wire is fed via the material feed 122 into the molten pool where it melts, thus forming the material deposits 202.

The interface layer 206 functions to substantially thermally isolate the substrate 208 from the material deposits 202. Following completion of the process 200, the material deposits 202 are formed on the interface layer 206. Heat from the material deposits 202 and heat from the forming beam 120 used to form the material deposits 202 can cause the interface layer 206 to at least partially melt. This melting increases a bond strength between the interface layer 206 and the substrate 208. Subsequent formation of the material deposits 202 further increases the bond strength between the interface layer 206 and the substrate 208.

The heat from the material deposits 202 may create a HAZ that is maintained in the interface layer 206. Through the use of the interface layer 206, heat from the material deposits 202 is maintained in the interface layer 206 long enough to avoid cracking of the material deposits 202, thereby protecting the structural integrity of the material deposits 202. Further, the interface layer 206 functions to substantially thermally isolate the substrate 208 from direct heating by the forming beam 120 used to form the material deposits 202, thereby also protecting the structural integrity of the substrate 208 portion of the component 204.

When the interface layer 206 is nickel-based, the interface layer 206 has a substantially higher ductility than a substrate 208 constructed from iron. As the material deposits 202 and the interface layer 206 cool, the interface layer 206 may stretch to accommodate shrinkage stresses from the cooling, whereas the iron would not stretch sufficiently to accommodate shrinkage stresses.

In the embodiment shown in FIG. 2, each of the material deposits 202 is constructed from a number of layers, e.g., first, second, and third layers 211, 213, 215 (and potentially further layers) 210 that are formed in a vertical fashion as deposited by the material feed 122 and subsequently heated by the forming beam 120. When the material feed 122 deposits material vertically, the process 200 does not require preheating of the component 204 or the interface layer 206. The material deposits 202 are defined by a height, H, and a width, W. The layers 210 (e.g., first layer 211, second layer 213, third layer 215, etc.) have a width substantially equal to the width W of the material deposits 202, and the layers 210 are defined by a thickness T. Due to the vertical deposition by the material feed 122, each of the layers 210 provides heat to the already formed layers 210 beneath and to the interface layer 206. For example, second layer 213 provides heat to first layer 211. In this way, heat dissipation in the interface layer 206 is gradual, and undesirable thermal stresses in the material deposits 202 and the component 204 are minimized.

In some embodiments, the component 204 includes an excavation 212 as formed by the excavation machine 106. The excavation 212 is defined by a depth, D, and a length, L. The excavation 212 may be formed by the excavation machine 106 in various shapes and sizes such that the component 204 is tailored for a target application or target repair procedure. In other embodiments, the component 204 does not include the excavation 212. In some embodiments, the AM machine 104 causes the material deposits 202 to be located within the excavation 212 formed by the excavation machine 106. For example, where a flaw (e.g., crack, dent, scratch, etc.) exists in the component 204, the process 200 may remove the flaw via the excavation machine 106 and then selectively fill the excavation 212 using the material deposits 202 via the AM machine 104. Depending on the process 200, the height, H, of the material deposits 202, as formed by the AM machine 104, may exceed the depth, D, of the excavation 212, as formed by the excavation machine 106; however, the depth, D, may be equal to or greater than the height, H.

As can be seen from the discussion above, certain features in the component 204 may be controllably excavated and replaced via the process 200. For example, a port in a head casting could be controllably excavated via the process 200 and a new port constructed by the material deposits 202. More generally, the component 204 may be controllably remanufactured for a target application.

Figure 3:
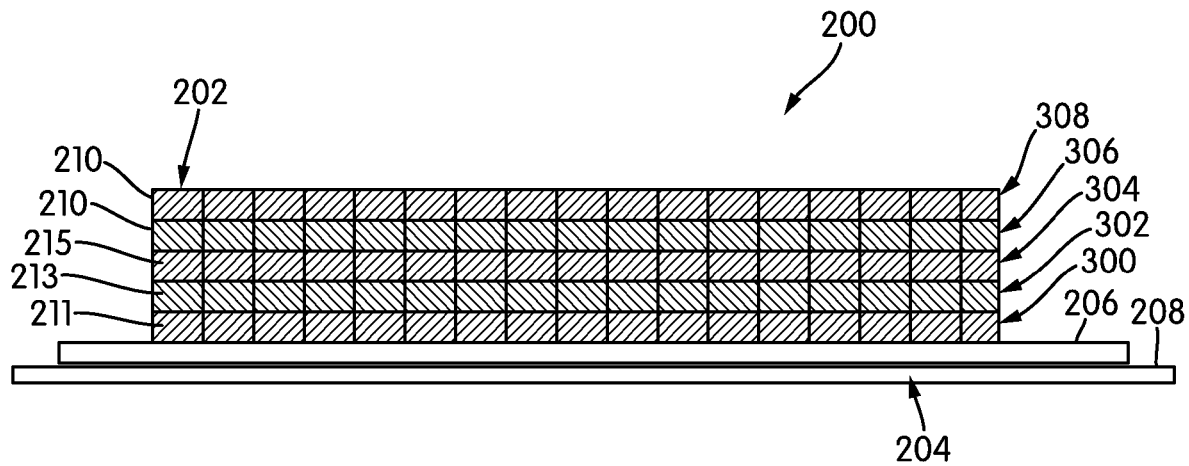
FIG. 3 is a cross-sectional view of material that has been added to a component in an example process according to an embodiment.

FIG. 3 illustrates a number of material deposits 202, each including a number of layers, e.g., first, second, and third layers 211, 213, 215 (and potentially further layers) 210, formed by the AM machine 104 on the interface layer 206 which is formed on the substrate 208 of the component 204 by the pretreating machine 107. Because the process 200 has the capability of forming the material deposits 202 in a layered fashion, via the AM machine 104, it is possible for each of the layers 210 (e.g., first layer 211, second layer 213, third layer 215, etc.) to be constructed from different materials (e.g., by the material feed 122 depositing different materials for each of the layers 210) or for each of the layers 210 to have different properties (e.g., by the forming beam 120 heating each of the layers 210 differently, by the material feed 122 supplying different materials for each of the layers 210, etc.). In this way, the material deposits 202 may have a graded composition. In some embodiments, some or all of the material deposits 202 may have a same material in a particular layer (e.g., a second layer of each material deposit 202 may be of a same material). By way of comparison, arc welding is not generally capable of tailoring each layer of a deposit to have different properties. Therefore, arc welding is not capable of producing deposits having graded compositions.

As shown in FIG. 3, the material deposits 202 have a first common layer 300, a second common layer 302, a third common layer 304, a fourth common layer 306, and a fifth common layer 308. In an example embodiment, the first common layer 300 is constructed from 80/20 nickel/iron, the second common layer 302 is constructed from 60/40 nickel/iron, the third common layer 304 is constructed from 40/40 nickel/iron and Inconel 20, the fourth common layer 306 is constructed from 20/20 nickel/iron and Inconel 60, and the fifth common layer 308 is constructed from Inconel 100, such that the material deposits 202 gradually transition from 80/20 nickel/iron to Inconel 100 in this example.

The process 200 may be used to remove a feature in the component 204, where the feature is constructed from one material, and replace the feature with a same or different material (in a same or different size and shape). For example, the layers 210 (e.g., first layer 211, second layer 213, third layer 215, etc.) may have materials that allow the material deposits 202 to have more advantageous properties. In this way, the process 200 may be used to selectively remanufacture the component 204 to provide replacement features having more advantageous properties.

In some embodiments, the process 200 may be implemented for wrought parts where the process 200 can be used to provide adequate properties relative to the needs of the wrought parts. For example, the component 204 may be a wrought iron cylinder head that requires higher strength mounting holes. Following this example, the process 200 may be implemented to form material deposits 202 of a high strength material proximate the mounting holes.

The material deposits 202 may be formed by the AM machine 104 on the component 204 over a target length. Depending on a ratio between the target length (e.g., length L in FIG. 2) of the material deposits 202 combined and the width (e.g., width W of a single material deposit 202 in FIG. 2), it may be selected to form the material deposits 202 vertically or horizontally. For example, if the ratio is below a target threshold it may be selected to form the material deposits 202 horizontally. In these cases, layers 210 may be horizontally formed sequentially in a reciprocal fashion until the material deposits 202 have attained a desired height (e.g., height H in FIG. 2). Even when the AM machine 104 is used to deposit material horizontally, the process 200 does not require preheating of the component 204 or the interface layer 206. In some embodiments, the target threshold may be related to an acceptable range of temperatures for the interface layer 206, the substrate 208, and the layers 210. For example, the target threshold may be selected so that the interface layer 206 maintains a desired temperature. However, even if the ratio indicates to deposit the layers 210 of the material deposits 202 horizontally, the controller 102 may elect to still deposit the layers of the material deposits 202 vertically.

In some embodiments, it may be desirable for the system 100 to group several material deposits 202 together such that the group of material deposits 202 are formed together via the AM machine 104, and then to move on to forming another group of material deposits 202. For example, a group of three material deposits 202 may be formed via the AM machine 104 in a sequence, such as a circular, spiral forming sequence.

The process 200 can mitigate thermal stresses experienced in both the material deposits 202 and the component 204 by forming the material deposits 202 either vertically or horizontally depending on the ratio between the target length of all of the material deposits 202 and the width of a single material deposit 202. By mitigating thermal stresses, the process 200 protects the structural integrity of the material deposits 202 and the component 204. Additionally, the process 200 does not require preheating of the substrate 208 and/or the component 204.

Figure 4:
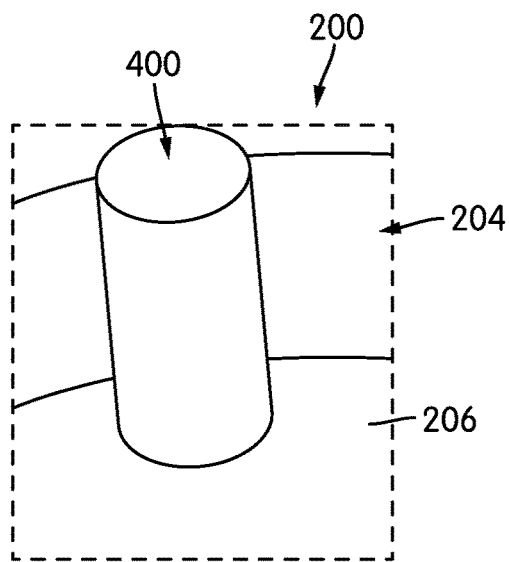
FIG. 4 is a top perspective view of a material deposit that has been formed on a component in an example process according to an embodiment.
Figure 5:
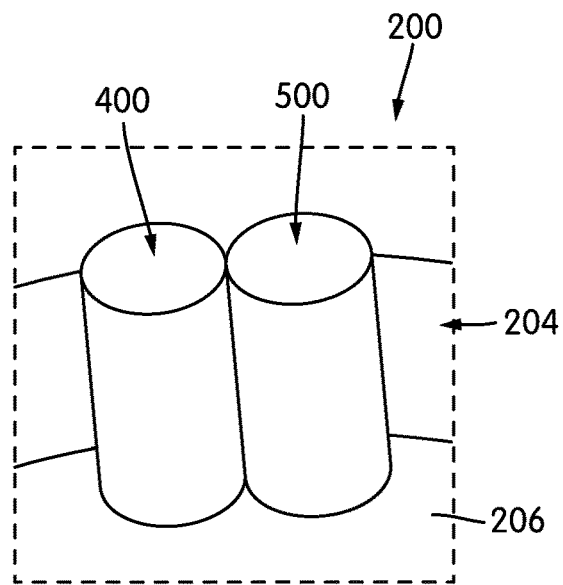
FIG. 5 is a top perspective view of two material deposits that have been formed on a component in an example process according to an embodiment.
Figure 6:
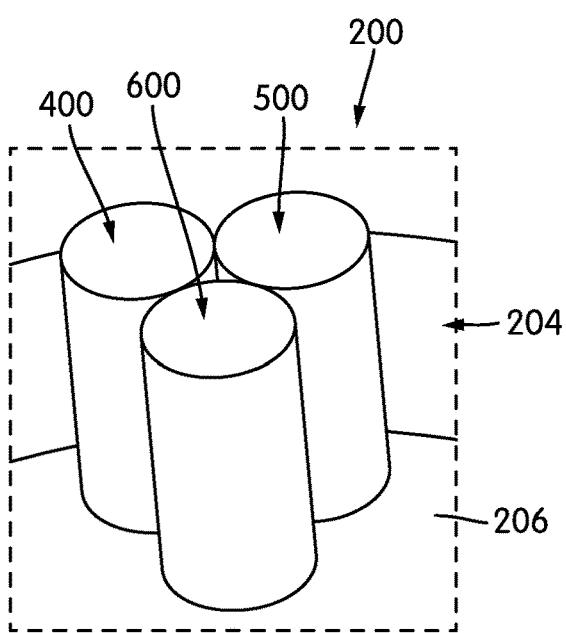
FIG. 6 is a top perspective view of three material deposits that have been formed on a component in an example process according to an embodiment.

FIGS. 4-6 illustrate an example of the process 200 where an initial material deposit 400, an intermediate material deposit 500, and a terminal material deposit 600 are formed by the AM machine 104 in progressive stages. In FIG. 4, the initial material deposit 400 is formed on the interface layer 206 on the component 204, then, as shown in FIG. 5, the intermediate material deposit 500 is formed on the interface layer 206 adjacent the initial material deposit 400, and then, as shown in FIG. 6, the terminal material deposit 600 is formed on the interface layer 206 adjacent the initial material deposit 400 and adjacent the intermediate material deposit 500. In one example, each of the layers 210 (e.g., first layer 211, second layer 213, third layer 215, etc.) for each of the initial material deposit 400, the intermediate material deposit 500, and the terminal material deposit 600 is formed first before depositing the others of the initial material deposit 400, the intermediate material deposit 500, and the terminal material deposit 600. In other embodiments, a first layer 211 of the initial material deposit 400 is formed first, then a first layer 211 of the intermediate material deposit 500 is formed, then a first layer 211 of the terminal material deposit 600 is formed, then a second layer 213 of the initial material deposit 400 is formed on the first layer 211 of the initial material deposit 400, and so on.

Figure 7:
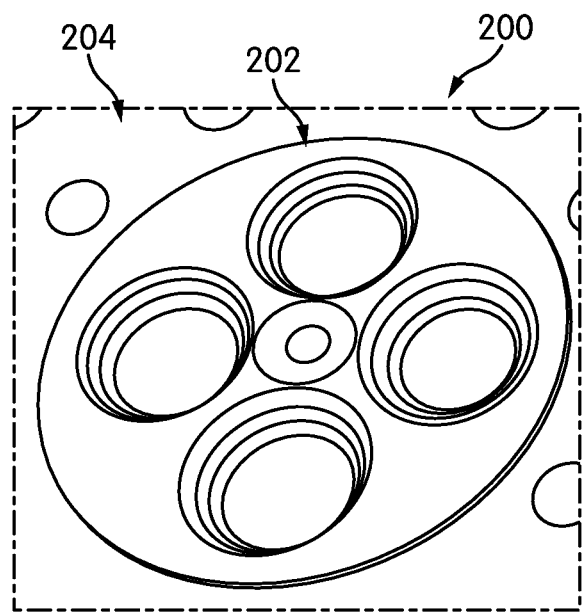
FIG. 7 is a top perspective view of material deposits that have been formed on a component in an example process according to an embodiment.
Figure 8:
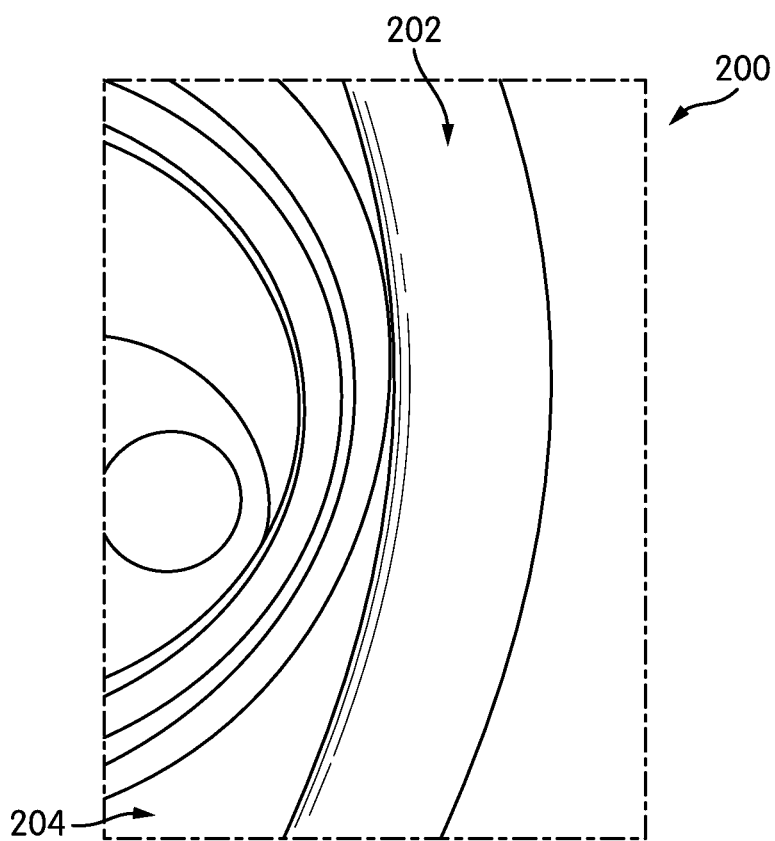
FIG. 8 is a detailed top perspective view of material deposits that have been formed on a component in an example process according to an embodiment.

FIGS. 7 and 8 illustrate material deposits 202 on a component 204. The material deposits 202 can be added to the component 204 by the AM machine 104 in various shapes, sizes, and configurations such that the component 204 is remanufactured by the system 100 for a target application. According to various embodiments, the heat applied by the forming beam 120 in the process 200 causes the material deposits 202 to bond with the component 204, making the material deposits 202 structurally coupled to the component 204. In the process 200, the material deposits 202 undergo phase transformations (e.g., from powder to molten to solid, etc.) due to the application of heat from the forming beam 120 and subsequent cooling.

Figure 9:
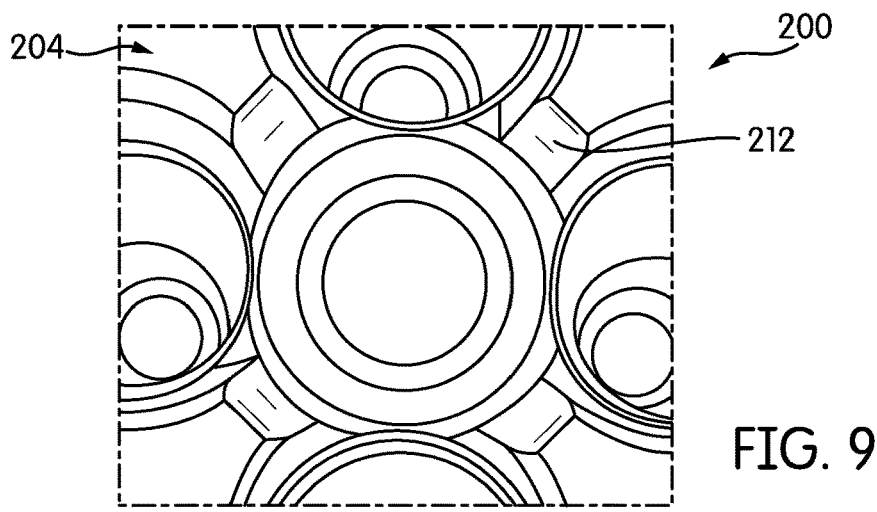
FIG. 9 is a top perspective view of an excavation in a component according to an embodiment.
Figure 10:
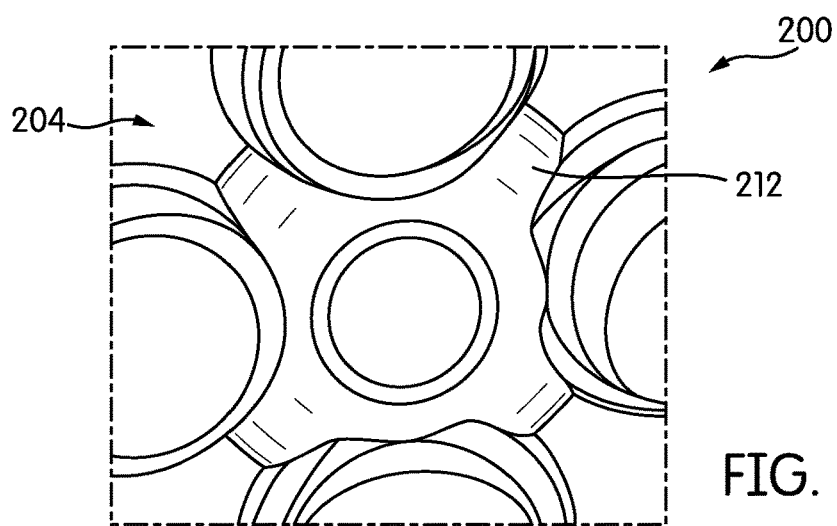
FIG. 10 is a top perspective view of an excavation in a component according to an embodiment.
Figure 11:
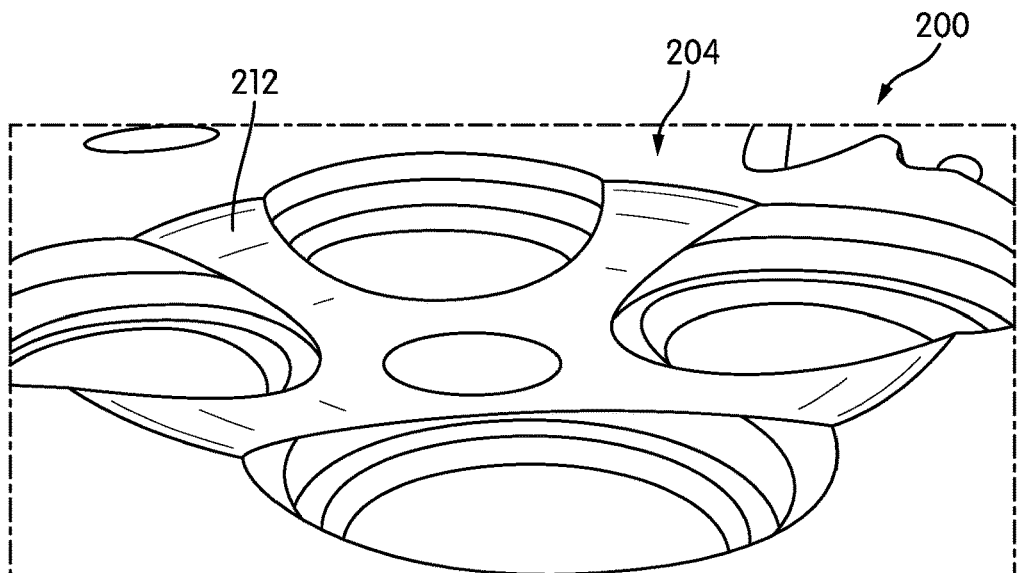
FIG. 11 is a top perspective view of an excavation in a component according to an embodiment.

FIGS. 9-11 illustrate various designs of the excavation 212 as formed by the excavation machine 106 in the process 200. According to various embodiments, the excavation 212 in the component 204 is formed by the excavation machine 106 such that residual stresses in subsequently formed material deposits 202 are reduced. For example, as shown in FIG. 9, the excavation 212 may be formed by the excavation machine 106 such that the excavation 212 has sharp angles. In another example, as shown in FIG. 10, the excavation 212 may be formed by the excavation machine 106 such that the excavation 212 has blended angles. In yet another example, as shown in FIG. 11, the excavation 212 may be formed by the excavation machine 106 such that the excavation 212 has shallow, gradual angles. The process 200 may be implemented such that the excavation 212 is formed by the excavation machine 106 to reduce residual stresses in the material deposits 202 and such that the AM machine 104 forms the material deposits 202 to selectively replace and/or add material so that the component 204 is tailored for a target application.

While the process 200 has been described with respect to a component 204 of cast iron in some instances, it is to be understood that the process 200 may be similarly implemented with components 204 constructed of other materials such as iron alloys, steels, and other metallic materials.

Figure 12:
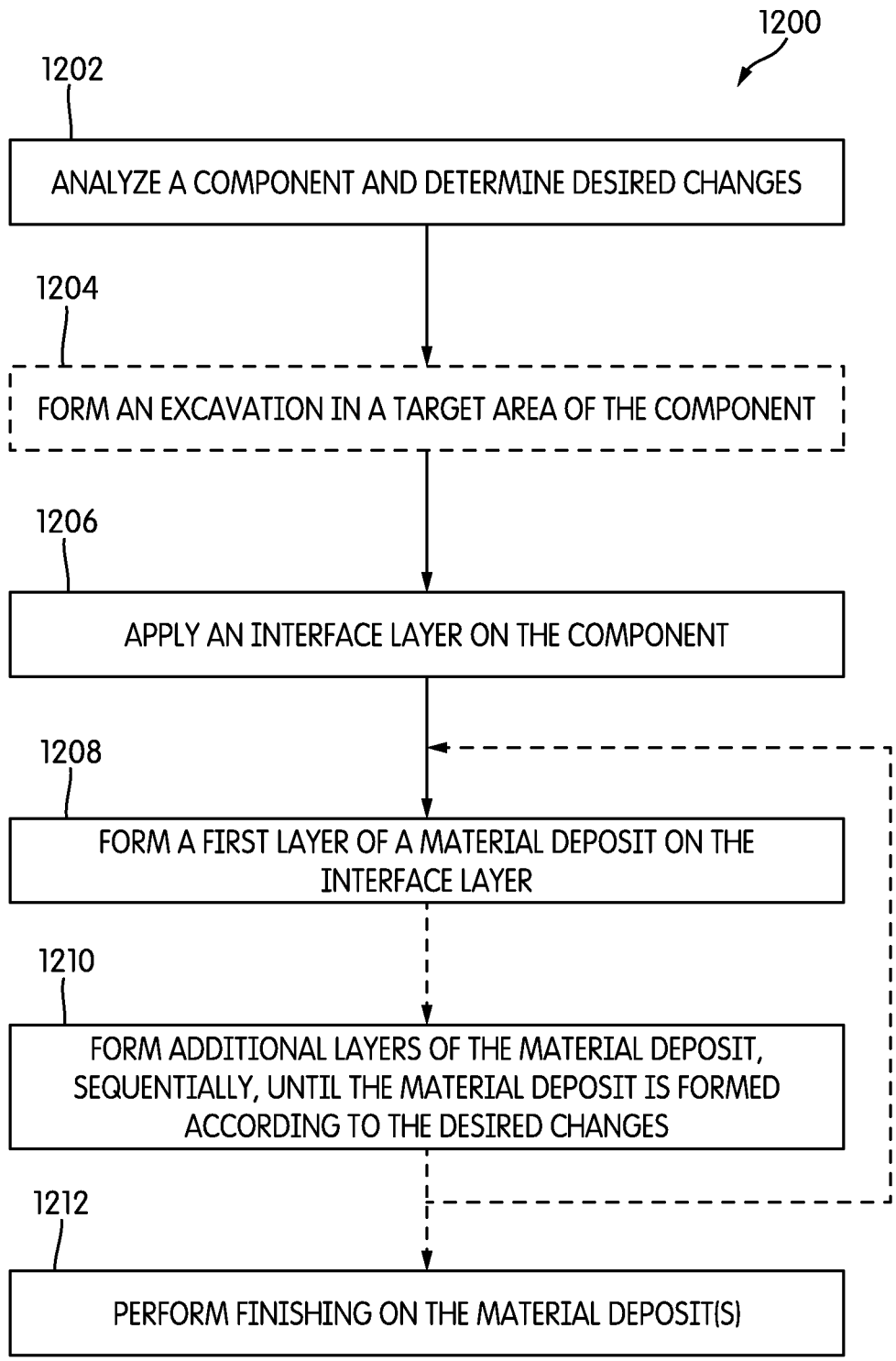
FIG. 12 is a block diagram of a method for forming material deposits on a component according to an embodiment.

FIG. 12 illustrates a method 1200 for using the system 100 to form the material deposits 202 on the component 204. First, at 1202, the component 204 is analyzed for desired changes. This analysis is performed by the component analysis module 114 in the controller 102. For example, an operator may receive a cylinder head for an internal combustion engine and may wish to alter the cylinder head such that a different compression ratio for the internal combustion engine may be achieved. In another example, at 1202, the component 204 may be scanned for flaws to determine desired changes to the component to eliminate the flaws. Following this example, the desired changes may be excavation and replacement of flawed regions of the component 204.

Depending on the application, the system 100 may utilize the excavation machine 106 to form an excavation 212 in a target area of the component at 1204. For example, an excavation 212 may be formed to selectively remove a defective area such as an area containing a crack or blemish. Next, at 1206, the pretreating machine 107 applies an interface layer 206 on the component. For example, the pretreating machine 107 may apply the interface layer 206 within the excavation 212 formed by the excavation machine 106 in at 204.

Next, at 1208, the AM machine 104 forms a first layer 211 of a material deposit 202 on the interface layer 206. For example, the material feed 122 deposits an amount of material for the first layer 211 on the interface layer 206 and the forming beam 120 melts the material into the first layer 211 of the material deposit 202. Depending on the desired changes, more layers 210 (e.g., second layer 213, third layer 215, etc.) for the material deposit 202 and/or additional material deposits 202 may be desired. If additional layers 210 are desired for the material deposit 202, the AM machine 104 deposits additional layers 210, at 1210, on the material deposit 202 in a sequential order until the material deposit 202 has the desired number of layers 210. If additional material deposits 202 are desired, the method 1200 loops back to 1208 for each of the additional material deposits 202. Once all of the layers of all of the planned material deposits 202 have been formed by the AM machine 104, the component 204 may have the desired changes. In some applications, it is desired for the component 204 to be subjected to finishing (e.g., polishing, sanding, honing, reaming, buffing, painting, coating, etc.) at 1212. For example, the component 204 may be reamed by an operator and/or by automated machinery at 1212.

While the present disclosure contains specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be noted that references to "front," "rear," "upper," "top," "bottom," "base," "lower," and the like in this description are used to identify the various components as they are oriented in the Figures. These terms are not meant to limit the component which they describe, as the various components may be oriented differently in different embodiments.

Further, for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It is important to note that the construction and arrangement of the system shown in the various example implementations are illustrative and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A system comprising:
    a controller;
    an excavation machine coupled to the controller, the excavation machine comprising an excavator configured to selectively remove material from a component so as to form an excavation;
    a pretreating machine coupled to the controller, the pretreating machine comprising a pretreater structured to form an interface layer on the excavation via a thermal spray propelled from the pretreater; and
    an additive manufacturing machine coupled to the controller, the additive manufacturing machine comprising:
        a material feed configured to selectively provide a first amount of material on the interface layer; and
        a forming beam configured to substantially melt the first amount of material so as to form a first layer of a first material deposit on the interface layer.

2. The system of claim 1, wherein the component is a cast iron component.

3. The system of claim 1, wherein selectively removing the material from the component comprises selectively removing a flawed portion of the component.

4. The system of claim 2, wherein the material feed is further configured to selectively provide a second amount of material on the first layer of the first material deposit; and
    wherein the forming beam is further configured to substantially melt the second amount of material on the first layer of the first material deposit so as to form a second layer of the first material deposit on the first layer of the first material deposit.

5. The system of claim 4, wherein the material feed is further configured to selectively provide a third amount of material on the interface layer adjacent the first material deposit; and
    wherein the forming beam is further configured to substantially melt the third amount of material so as to form a first layer of a second material deposit on the interface layer.

6. The system of claim 2, wherein the material feed is further configured to selectively provide a second amount of material on the interface layer adjacent the first material deposit;
    wherein the forming beam is further configured to substantially melt the second amount of material so as to form a first layer of a second material deposit on the interface layer;
    wherein the material feed is further configured to selectively provide a third amount of material on the first layer of the first material deposit; and
    wherein the forming beam is further configured to substantially melt the third amount of material on the first layer of the first material deposit so as to form a second layer of the first material deposit on the first layer of the first material deposit.

7. The system of claim 2, wherein the material feed is further configured to selectively provide a second amount of material on the interface layer adjacent the first material deposit;
    wherein the forming beam is further configured to substantially melt the second amount of material so as to form a first layer of a second material deposit on the interface layer;
    wherein the material feed is further configured to selectively provide a third amount of material on the first layer of the second material deposit; and
    wherein the forming beam is further configured to substantially melt the third amount of material on the first layer of the second material deposit so as to form a second layer of the second material deposit on the first layer of the second material deposit.

8. The system of claim 2, further comprising a sensor configured to determine a depth of the first layer of the first material deposit and to provide the depth to the controller.

9. The system of claim 8, wherein the controller is configured to compare the depth to a target depth; and
    wherein the material feed is further configured to selectively provide a second amount of material: (i) on the first layer of the first material deposit or (ii) on the interface layer adjacent the first material deposit, based on the comparison between the depth and the target depth.

10. The system of claim 8, wherein the controller is configured to compare the depth to a target depth;
    wherein the material feed is further configured to selectively provide a second amount of material: (i) on the first layer of the first material deposit or (ii) on the interface layer adjacent the first material deposit based on the comparison between the depth and the target depth;
    wherein the first amount of material comprises a first nickel-based alloy; and
    wherein the second amount of material comprises a second nickel-based alloy different from the first nickel-based alloy.

11. The system of claim 2, wherein the interface layer thermally isolates the component from: (i) the material feed as the first amount of material is provided on the interface layer and (ii) the forming beam as the first amount of material is melted on the interface layer.

12. The system of claim 2, wherein the interface layer has a first thickness and the first layer of the first material deposit has a second thickness; and
    wherein the first thickness is less than the second thickness.

13. The system of claim 1, wherein the material feed is configured to selectively provide the first amount of material within the excavation.

* * * * *